Dec. 8, 1964  C. EISEN  3,160,092
APPARATUS FOR PRINTING ON CYLINDRICAL CONTAINERS
Original Filed April 17, 1963
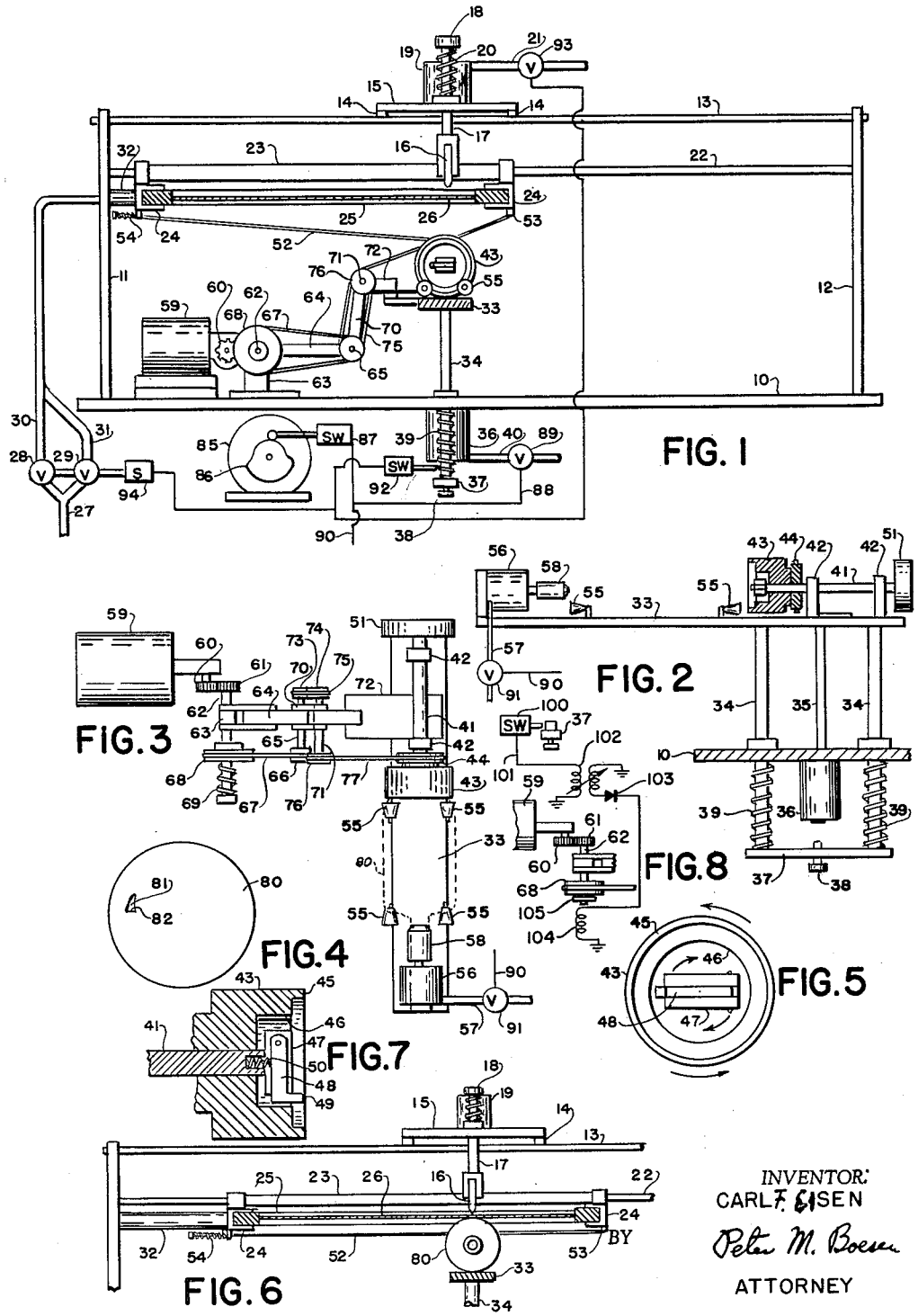
INVENTOR:
CARL F. EISEN
BY Peter M. Boesen
ATTORNEY

United States Patent Office 3,160,092
Patented Dec. 8, 1964

3,160,092
APPARATUS FOR PRINTING ON CYLINDRICAL CONTAINERS
Carl Eisen, 157 W. 21st St., New York, N.Y.
Continuation of application Ser. No. 273,759, Apr. 17, 1963. This application Jan. 20, 1964, Ser. No. 340,592
2 Claims. (Cl. 101—124)

This patent application is a continuation of my pending patent application Ser. No. 273,759 filed on April 17, 1963.

This invention relates in general to printing apparatus and, more particularly, to apparatus for silk screening characters and designs on plastic bottles and the like.

A main object of this invention is to provide a screening apparatus for printing on the cylindrical portions of plastic containers, said apparatus being more rapid in its operation, more positive in its printing, less prone to failure, and more easily maintained.

Another object of this invention is to provide a more efficient drive means for rotating a positioning chunk in such a screening apparatus.

Many other objects, advantages and features of invention will become apparent from the following description and accompanying drawing wherein:

FIGURE 1 is a front view of my invention with a silk screen and the elevating table shown in section;

FIGURE 2 is a transverse vertical section through the base of my invention showing the workpiece holding and positioning elements mounted on the elevating table;

FIGURE 3 is a top view of the elevating table, the workpiece holding elements and the drive means for the workpiece positioning chuck;

FIGURE 4 is a bottom view of a plastic bottle or other container which may be printed upon with my apparatus;

FIGURE 5 is a front view of the workpiece positioning and holding chuck;

FIGURE 6 is a front view through a fragment of the apparatus of this invention showing a workpiece on the elevating table in the elevated position with the workpiece contacting the silk screen;

FIGURE 7 is a longitudinal vertical section through a fragment of the workpiece holding and positioning chuck; and FIGURE 8 shows in schematic form a modification of the drive for the workpiece positioning chuck.

Referring to the drawing in detail, FIGURE 1 shows a base 10 to which there are fixed the upstanding side plates 11 and 12. A pair of rectangular spacing rods 13 extend between the front and back portions of the side plates 11 and 12. Two forwardly extending support members 14 and 15 support the base 15 and are fixed to the rods 13. Silk screen squeegee 16 is supported by a pair of rods 17 which extend through the base 15. A top member 18 joins the tops of the rods 17 and is connected to an air cylinder 19 fixed to base 15. Springs 20 urge the squeegee 16 upward so that air entering air cylinder 19 through tube 21 will urge squeegee 16 downward against the springs 20.

Disposed under the spacing rods 13 are a pair of guide rods 22 about which the slide member 23 is mounted. Fixed to the bottom of slide member 23 and extending forward from it are the support brackets 24 which hold the frame 25 of a silk screen 26. A tube 27 leads from an air supply (not shown) through the two valves 28 and 29 to the tubes 30 and 31. Tubes 30 and 31 lead to the ends of a long air cylinder 32. Air passing through the valves 28 and 29 thus activates the air cylinder 32 to urge slide member 23 along the guide rods 22 and to retract slide member 23 into the position shown in FIGURE 1.

Referring now to FIGURES 1 and 2, an elevating table 33 is mounted on the two support rods 34 which extend slidably through the base 10. The piston rod 35 of an air cylinder 36 mounted under base 10 extends through base 10 to raise elevating table 33 when cylinder 36 is activated. A bottom member 37 extends between the rods 34 and has the adjustable stop 38 mounted in it to adjust the amount of elevation of table 33. Springs 39 urge table 33 downward against the action of cylinder 37. A tube 40 is connected to cylinder 36 and an air supply (not shown).

Referring now to FIGURES 1, 2, 3, 5 and 6, workpiece or plastic bottle holding means are mounted on table 33. A shaft 41 is rotatably mounted by the two supports 42. A positioning chuck 43 is mounted to rotate about the front end of shaft 41. Disposed directly behind and fixed to positioning chuck 43 is a drive sprocket 44. Positioning chuck 43 has an outer rim 45 and a central cavity 46. As shown in FIGURE 7, shaft 41 extends into cavity 46 and has the slotted block 47 fixed to rotate with it. A hook member 48, having the forwardly projecting tip portion 49, is pivotally secured within the slotted block 47 and is urged outward by a compression spring 50.

As shown in FIGURES 1, 2 and 3, a drum 51 is fixed to the rearmost end of shaft 41 and has several turns of the fine wire 52 wrapped about and fixed to it. One end of the wire 52 is fixed to the forward edge 53 of slide 23. The other end of wire 52 is fixed to the rearmost end of slide member 23 by means of a spring takeup device 54. Thus it may be seen that the lateral motion of slide 23 will cause wire 52 to rotate drum 51 and thereby hook member 48.

Referring further to FIGURES 1, 2 and 3, four rotatably mounted conical guides 55 are mounted on the elevating table 33 in front of the positioning chuck 43. At the other end of the elevating table 33 an air cylinder 56 is mounted and connected to a tube 57. When cylinder 56 is activated, it moves its piston rod outward to urge the bottle neck engaging plug 58 toward the positioning chuck 43.

FIGURES 1 and 3 show the outer portion 43 of the positioning chuck is driven counter clockwise by the electric motor 59. Motor 59 drives pinion 60 which is engaged by pinion 61 mounted on shaft 62. Shaft 62 is rotatably mounted in a support 63. A link 64 is pivotally mounted about shaft 62 and has the shaft 65 rotatably mounted at its end. Shaft 65 carries sprocket 66 which is driven by chain 67 and sprocket 68. Sprocket 68 is rotatably mounted on shaft 62 and serves as a clutch as the compression spring 69 urges sprocket 68 against a flange.

Link 70 is pivotally secured about shaft 65 and about shaft 71 which is rotatably journalled in the extension 72 of elevating table 33. Shaft 65 drives shaft 71 by means of two sprockets 73 and 74 and a chain 75. A sprocket 76 is mounted on shaft 71 to drive sprocket 44 by means of chain 77. Thus it may be seen that motor 59 may drive the workpiece holding and positioning chuck 43 with table 33 in the lower or elevated position. Spring 69 may be adjusted so that sprocket 68 is driven with a desired torque.

This invention operates and is used in the following manner. A bottle 80, as shown in FIGURE 4, is molded of plastc with a positioning indentation 81 formed in its bottom. Indentation 81 has an upstanding radial wall portion 82. Motor 59 is started to rotate the positioning chuck 43 in a counter clockwise direction as shown in FIGURE 5. A plastic bottle or other container 80 is placed in front of the positioning chuck 43 with its neck towards the bottle neck engaging plug 58. Timing motor 85 is then started to slowly rotate cam 86 and throw switch 87 for a desired period of time. Switch 87, by means of lead 88, opens the solenoid valve 89 in tube 40 and, by means of lead 90 opens valve 91 in tube 57. As valve 91 opens, cylinder 56 causes plug 58 to push the bottom of a bottle 80 against the chuck 43. Chuck 43 rotates the bottle 80 until the tip portion 49 of hook member 48 enters indentation 81 and engages the radial wall 82. Hook member 48 then stops the rotation of bottle 80 and chuck 43 as shaft 62 rotates within sprocket 68.

Air cylinder 36 raises the elevating table 33 and the bottle 80 positioned thereon until the side of the bottle 80 contacts the silk screen 26 as shown in FIGURE 6. As the elevating table moves upward the bottom member 37 closes switch 92 which opens valve 93 to activate air cylinder 19 and lower the silk screen squeegee 16 against the top of the silk screen 26. Switch 92 also activates solenoid 94 which opens and closes valves 28 and 29 so that air from tube 27 rapidly drives the double acting cylinder 32 to move slide 23 to the right as shown in FIGURES 1 and 6.

As shown in FIGURE 6, as slide 23 moves to the right, wire 52, which extends about drum 51, rotates the shaft 41 and thereby the hook member 48 to rotate bottle 80 with the same surface speed as that of silk screen 26. Thus the drum 51 must be of substantially the same diameter as the container being silk screened.

As timing motor 85 continues to run, cam 86 rotates to open switch 87. Switch 87 then closes valve 89 allowing springs 39 to drop elevating table 33 back down into the position shown in FIGURE 1. The opening of switch 87 also closes valve 91 so that air cylinder 56 withdraws plug 58 to release container 80. As elevating table 33 and bottom member 37 move downward, switch 92 opens so that solenoid 94 opens and closes valves 28 and 29 to return slide 23 to the position shown in FIGURE 1. At the same time and before there is any appreciable movement of slide 23, switch 92 closes valve 93 so that spring 20 may raise the silk screen squeegee 16 from the silk screen 26.

In the operation of this invention, if it is desired, valve 91 may be activated by switch 92 as a container 80 will have time to be positioned as it is moved upward on table 33. A container 80 may be placed on elevating table 33 and timing motor 85 may then be activated to complete one cycle of operation to print the outer surface of one container at a time. If desired, timing motor 85 may run continuously and containers may be constantly removed and replaced by an operator at the appropriate time during each cycle.

FIGURE 8 shows an alternate drive means for the positioning chuck 43. In this embodiment of my invention an electric clutch replaces the spring clutch indicated by the reference numerals 68 and 69 of FIGURE 3. A switch 100 is closed as table 33 and bottom member 37 start to move upward during each cycle of this apparatus. By means of a lead 101 switch 100 connects the variable transformer 102 and the rectifiers 103 to a power source (not shown). The rectifiers 103 convert line A.C. current to D.C. current which is supplied to the coil 104 of a magnetic clutch 105 mounted on shaft 62. When coil 104 is energized, clutch 105 may have a moving element attracted by coil 104 which engages sprocket 68 to shaft 62 to rotate the workpiece positioning chuck 43. Sprocket 68 drives the workpiece holding chuck in the manner which has been described. Any type of magnetic clutch may be used. As table 33 drops downward at the end of a cycle, switch 100 opens to disengage clutch 105 so that the workpiece positioning chuck 43 is not driven and may stop rotating.

While I have disclosed my invention in the best forms known to me, it will nevertheless be understood that these are purely exemplary and that modifications may be made in the construction, combination and arrangement of parts except as it may be more limited in the appended claims wherein I claim:

1. In a silk screening apparatus for printing on the outer surface of a cylindrical container having a bottom portion containing a locating indentation; a slide member mounted to move laterally; a silk screen fixed to said slide member; means moving said slide member and said silk screen laterally; a silk screen squeegee mounted over said silk screen, means urging said silk screen squeegee against said silk screen when said silk screen moves laterally; an elevating table disposed below said silk screen; a container holding and locating chuck mounted on said elevating table, said container holding and locating chuck comprising a horizontal shaft rotatably mounted above said elevating table, hook means fixed to the forward end of said shaft, spring means urging said hook means forward, and an outer portion rotatably mounted about the forward end of said shaft, said outer portion having a rim and containing a central cavity within said rim within which said hook means fixed to the forward end of said shaft is disposed; means rotating said outer portion comprising a motor mounted beside said elevating table, a second shaft driven by said motor, said second shaft being parallel to said shaft of said container holding and locating chuck, a first sprocket mounted on said second shaft, a first link pivotally mounted about said second shaft, a third shaft rotatably mounted at the end of said first link, a second sprocket mounted on said third shaft, a first chain extending about said first and second sprockets so that said second shaft drives said third shaft, a second link pivotally mounted about said third shaft, a lateral projection from said elevating table, a fourth shaft rotatably mounted in said projection, the end of said second link being pivotally secured about said fourth shaft, a third sprocket mounted on said third shaft, a fourth sprocket mounted on said fourth shaft, a second chain disposed about said third and fourth sprockets so that said third shaft drives said fourth shaft, a fifth sprocket mounted on said fourth shaft, a drive sprocket fixed to said outer portion, and a third chain extending about said fifth sprocket and said drive sprocket rotating said drive sprocket, said first and second links pivoting as said elevating table moves upward and downward and said motor drives said outer portion; a drum fixed to the rearmost end of said shaft; a wire extending from said slide member about said drum, said drum being of substantially the same diameter as the container being silk screened; means mounted in front of said container holding and locating chuck urging a container against said outer portion to be rotated by contact with said outer portion until said hook means engages the positioning indentation in the bottom portion of the container preventing rotation of the container; and means raising said elevating table to hold a container against said silk screen beneath said silk screen squeegee before said means moving said slide member laterally moves said slide member, lateral motion of said slide member drawing said wire from about said drum rotating said drum, said shaft of said container holding and locating chuck, and thereby said hook means to rotate a container with the same surface speed as the linear velocity of said silk screen.

2. The combination according to claim 1 wherein said first sprocket is rotatably mounted on said second shaft and with the addition of magnetic clutch means engaging said first sprocket to said second shaft, a variable transformer supplying current to said magnetic clutch, and a switch closed by the raising of said elevating table, said switch connecting said variable transformer to said magnetic clutch means to rotate said outer portion.

References Cited by the Examiner
UNITED STATES PATENTS

| | | | |
|---|---|---|---|
| 2,209,688 | 7/40 | Davis | 101—124 |
| 2,556,657 | 6/51 | Martin | 101—124 |
| 3,109,365 | 11/63 | Karlyn | 101—124 |

WILLIAM B. PENN, *Primary Examiner.*